April 14, 1953     S. BERGSTEIN     2,634,564
MACHINE FOR SEALING THE ENDS OF WRAPPED ARTICLES
Filed Jan. 15, 1948     8 Sheets-Sheet 1

INVENTOR.
SAMUEL BERGSTEIN.
BY Allen & Allen
ATTORNEYS.

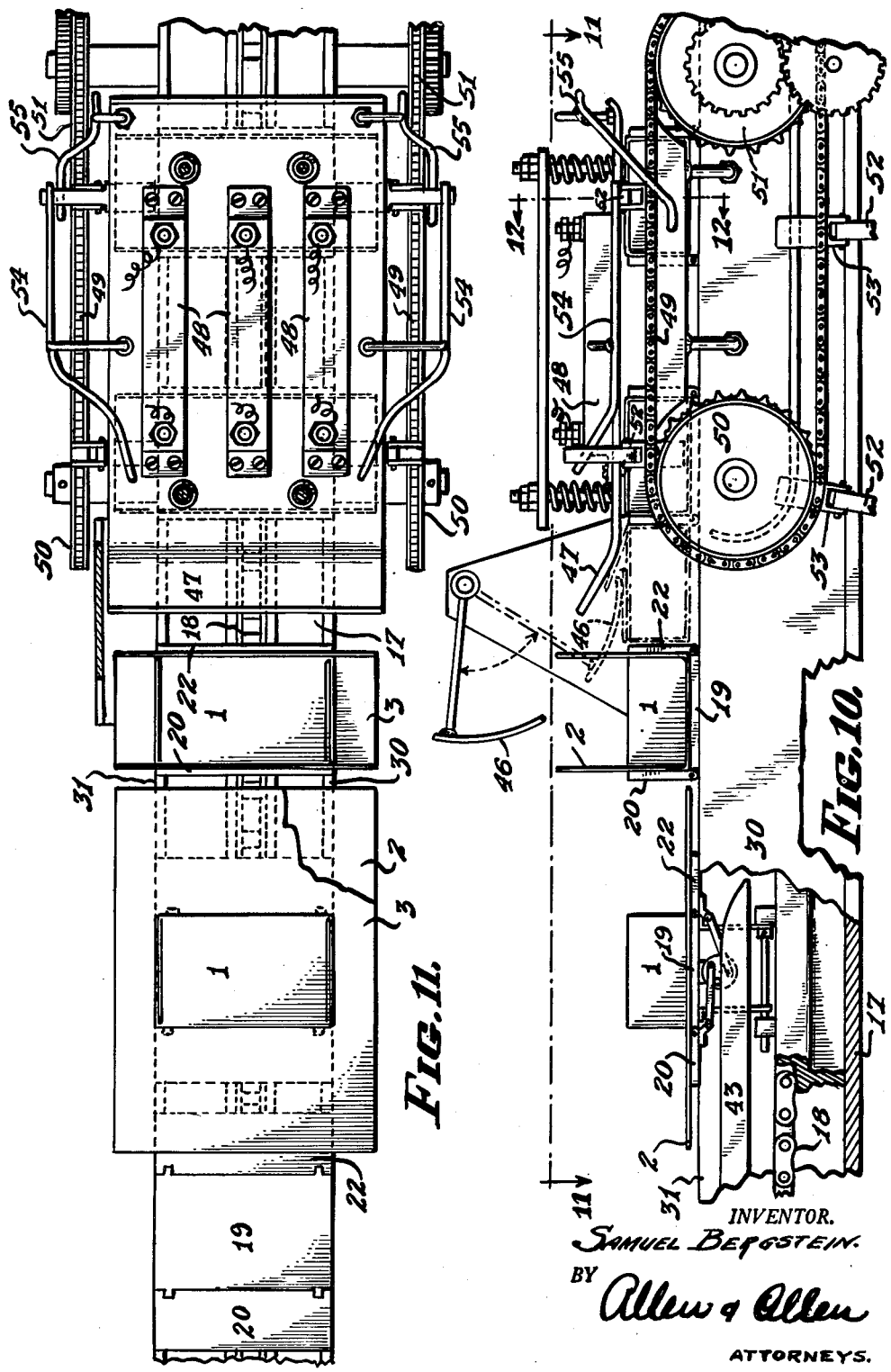

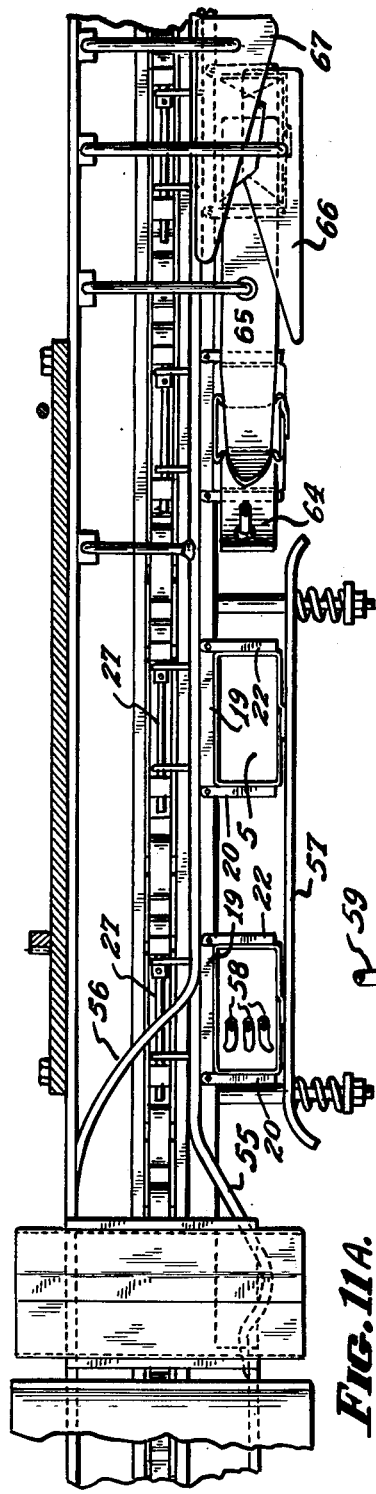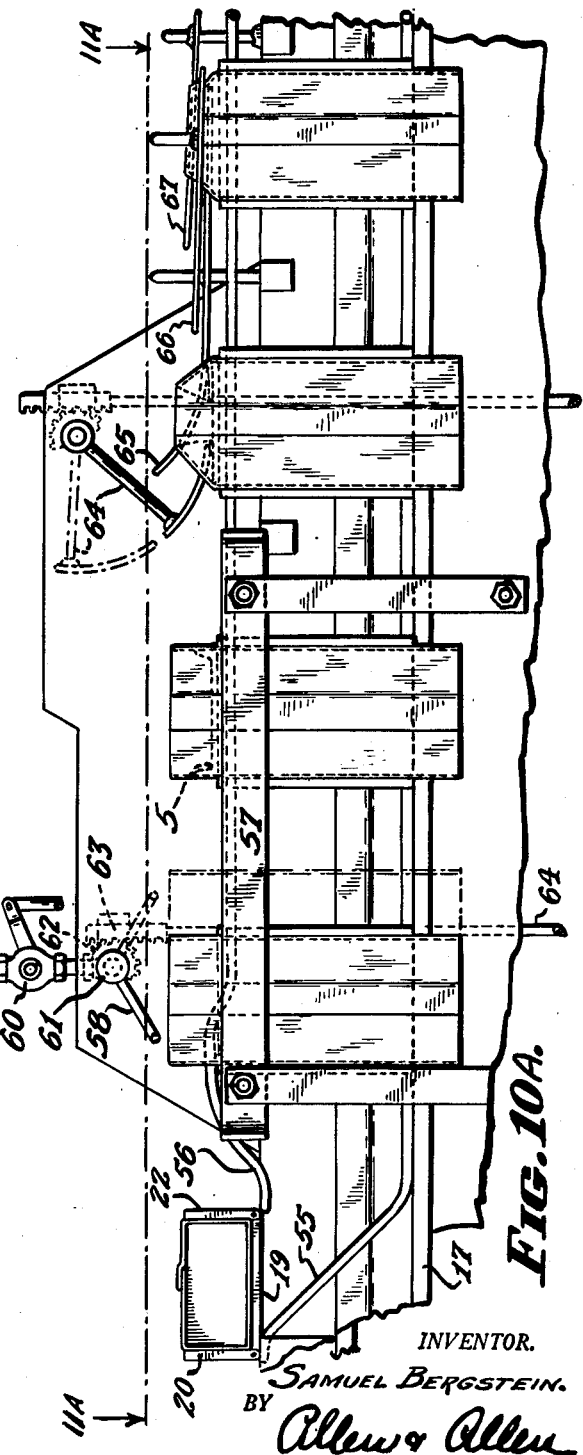

April 14, 1953     S. BERGSTEIN     2,634,564
MACHINE FOR SEALING THE ENDS OF WRAPPED ARTICLES
Filed Jan. 15, 1948     8 Sheets-Sheet 4
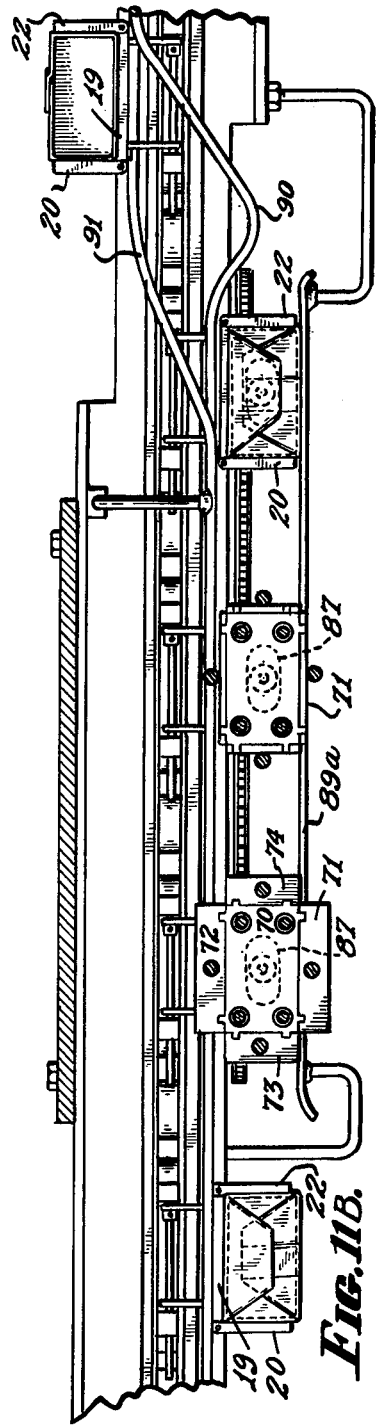
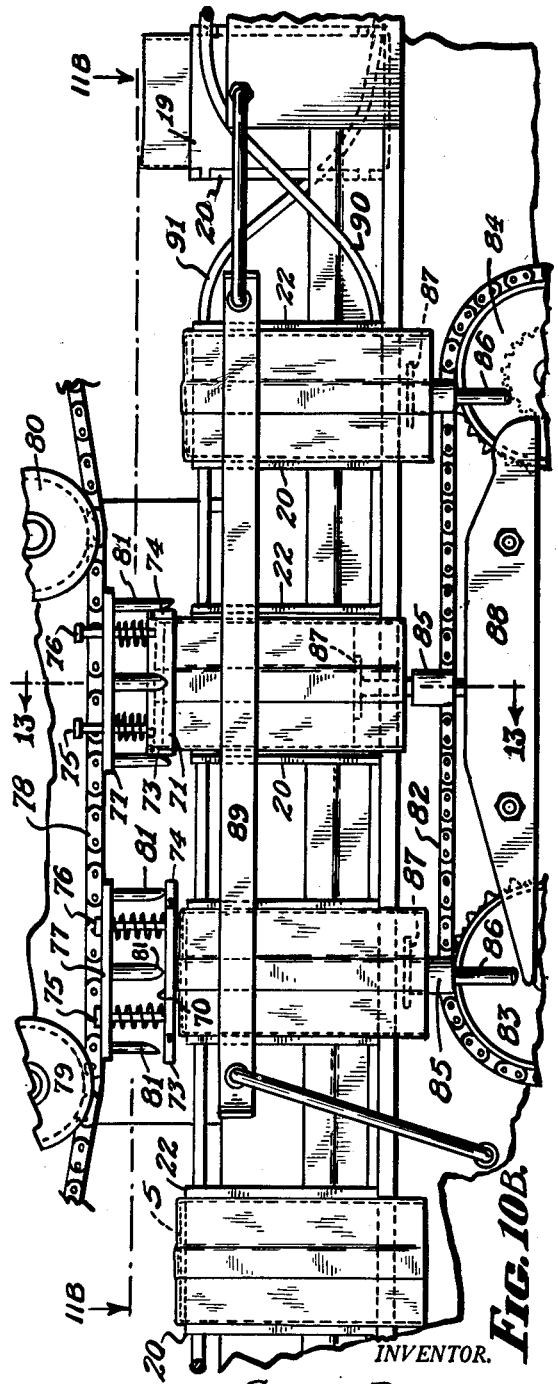
INVENTOR.
SAMUEL BERGSTEIN.
BY Allen & Allen
ATTORNEYS.

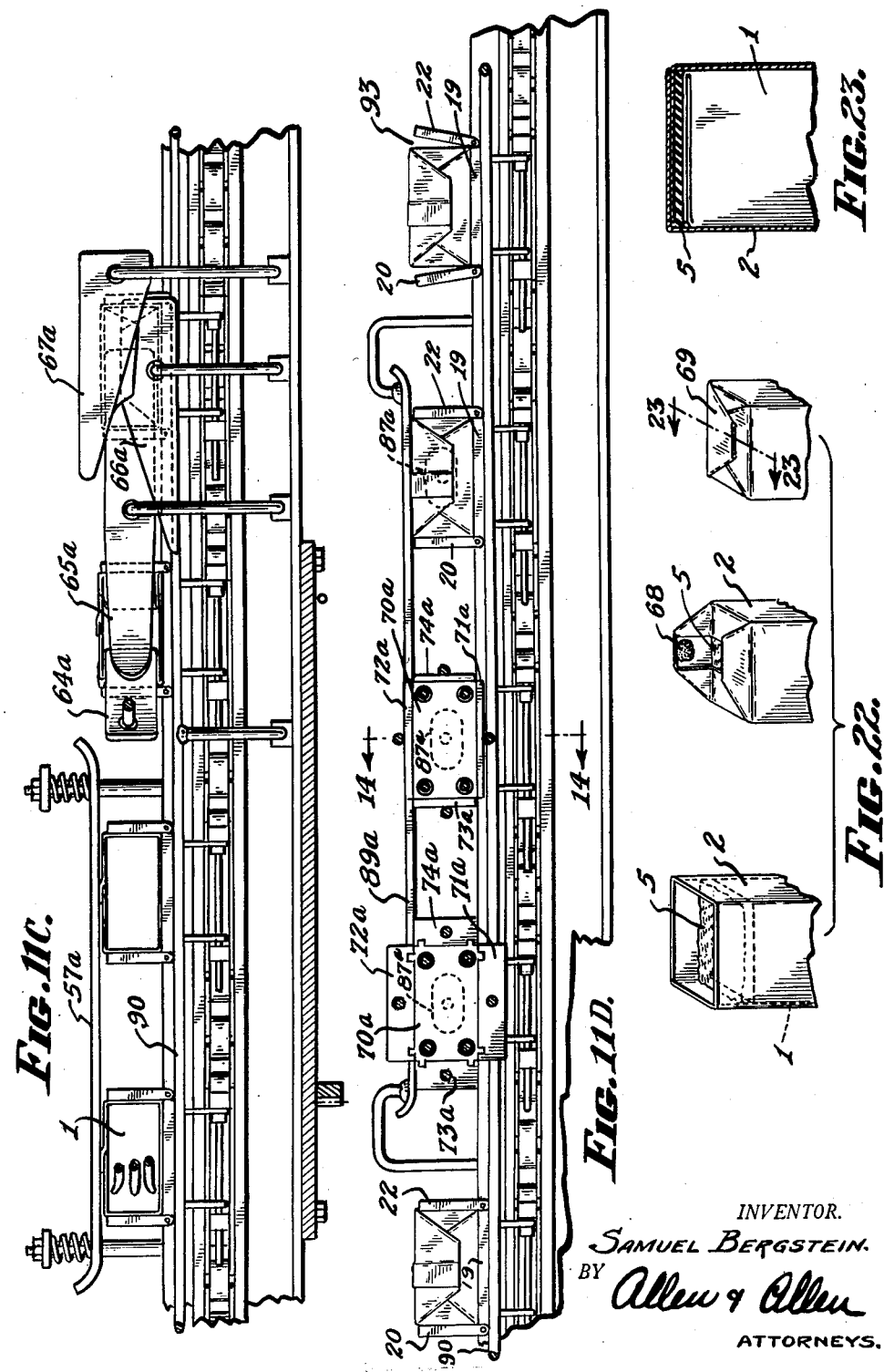

April 14, 1953 S. BERGSTEIN 2,634,564
MACHINE FOR SEALING THE ENDS OF WRAPPED ARTICLES
Filed Jan. 15, 1948 8 Sheets-Sheet 6
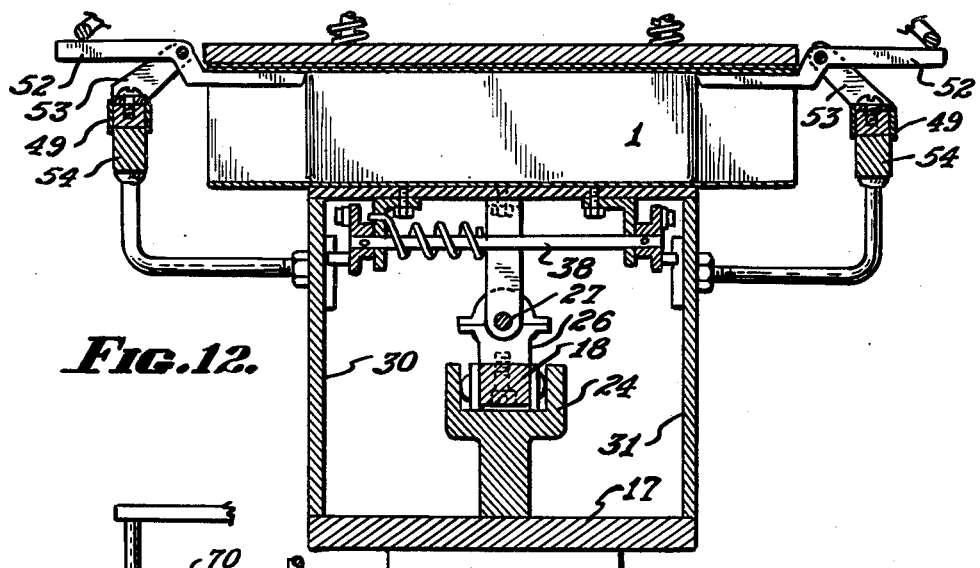
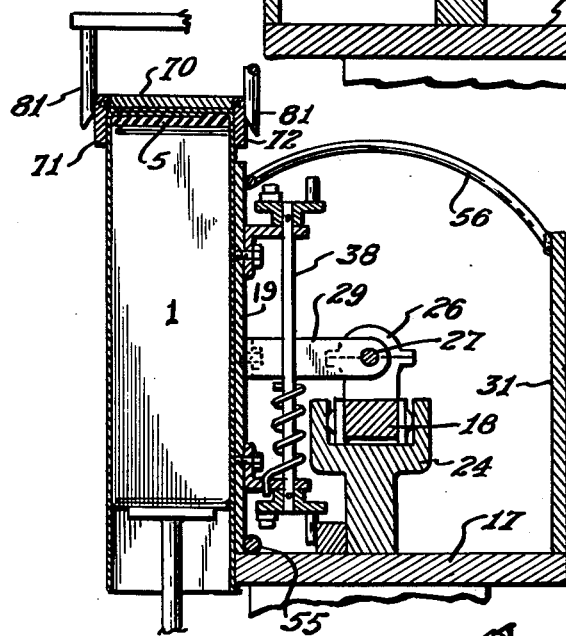
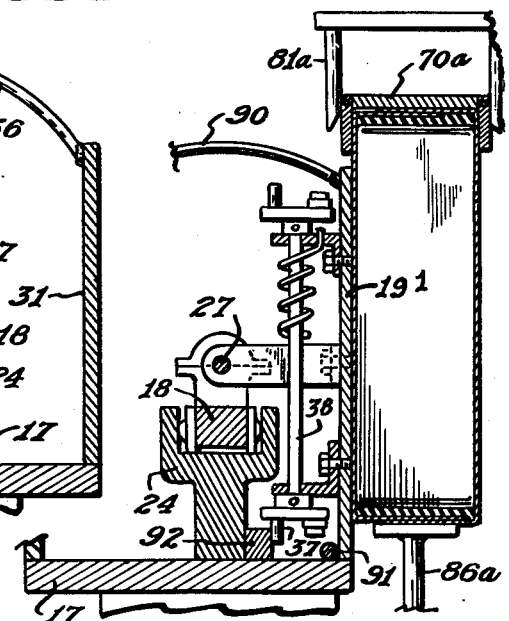
INVENTOR.
SAMUEL BERGSTEIN.
BY
Allen & Allen
ATTORNEYS.

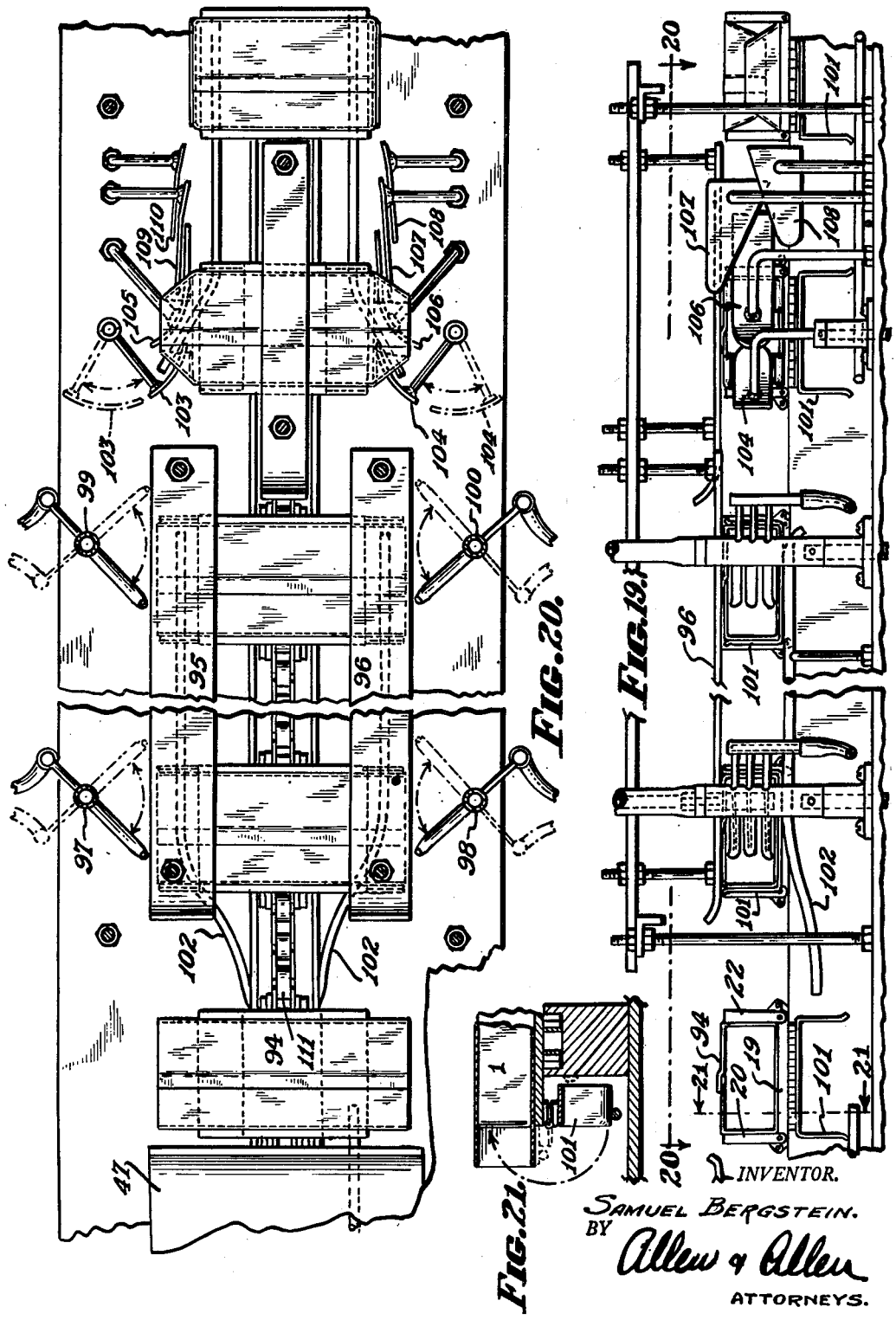

April 14, 1953   S. BERGSTEIN   2,634,564
MACHINE FOR SEALING THE ENDS OF WRAPPED ARTICLES
Filed Jan. 15, 1948   8 Sheets-Sheet 8

INVENTOR.
SAMUEL BERGSTEIN.
BY Allen & Allen
ATTORNEYS.

Patented Apr. 14, 1953

2,634,564

UNITED STATES PATENT OFFICE 2,634,564

MACHINE FOR SEALING THE ENDS OF WRAPPED ARTICLES

Samuel Bergstein, Cincinnati, Ohio

Application January 15, 1948, Serial No. 2,407

4 Claims. (Cl. 53—60)

1

My invention has to do with flexible walled packages which are tight against liquid, moisture, vapor, and gases.

It is an object of my invention to produce a flexible walled package cheaply, which package will be proof against gain or loss of moisture by the contents.

It is an object of my invention to produce a flexible walled package which will be gas tight, and in which the contents may dependably be protected by a special atmosphere.

It is an object of my invention to produce a flexible walled package which will not breathe in the sense of gaining or losing atmospheric content by reason of external changes in temperature and atmospheric pressure, in which package the contents will thus be absolutely protected against loss or gain of moisture and may, if desired, be protected by a special atmosphere.

It is an object of my invention to provide packages of this character rapidly and inexpensively, and while the process herein set forth is one which may be practiced by hand, it is my object to provide a package and a process of making it subject to ready mechanization in an economical manner.

It is an object of my invention to provide an improved flexible walled package of the type referred to, and a process and mechanism for making it in which notable advantages of economy are attained, especially in the elimination of parts and expensive manipulations.

It is an object of my invention to provide a type of flexible walled package which, having the advantages of proofness set forth above, nevertheless is neat and attractive in appearance, having the sales appeal of ordinary printed cartons.

These and other objects of my invention which will be set forth hereinafter or will be apparent to one skilled in the art upon reading these specifications I accomplish in that structure and arrangement of parts, and in that process and apparatus of which I shall now describe exemplary embodiments. Reference is made to the accompanying drawings wherein:

Figures 1 to 8 inclusive are diagrammatic views of perspective or elevational character illustrative of the various steps in my process.

Figure 10 is an elevational view with parts in section of one portion of an exemplary machine for carrying on the process of my invention.

2

Figure 11 is a plan view thereof with parts in section taken along the section line 11—11 of Figure 10.

Figure 10a and 10b are corresponding elevational views of additional sections of the machine.

Figures 11a, 11b, 11c and 11d are respectively plan views, with parts in section of additional portions or sections of the machine, Figure 11a being taken along the section line 11a—11a in Figure 10a, and Figure 11b being taken along the section line 11b—11b in Figure 10b.

Figure 12 is a vertical cross sectional view of apparatus having to do with the formation of a longitudinal seam, taken along the section line 12—12 of Figure 10.

Figure 13 is a sectional view through the apparatus of Figure 10b taken along the section line 13—13 in that figure.

Figure 14 is a sectional view of apparatus illustrated in Figure 11d, taken along the section line 14—14 of that figure.

Figure 15:
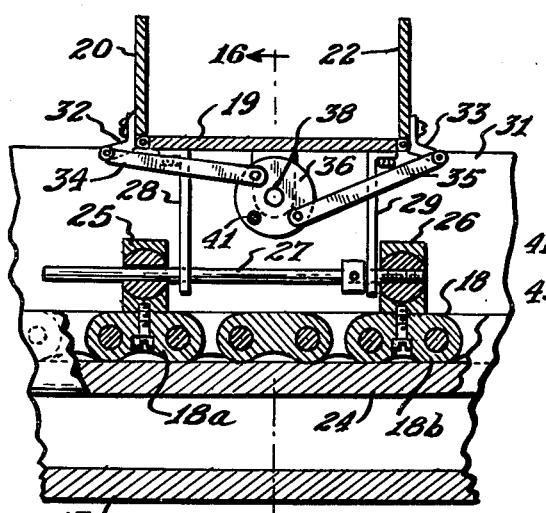
Figure 16:
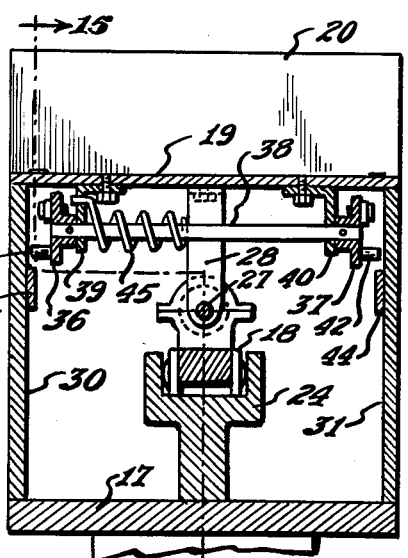

Figure 15 is a partial sectional view of apparatus having to do with the wrapping of a carton, the apparatus otherwise being illustrated in Figure 10, and is related to Figure 16 as indicated by the section line 15—15 in that figure.

Figure 16 is a transverse sectional view of the same apparatus taken along the section line 16—16 of Figure 15.

Figure 17:
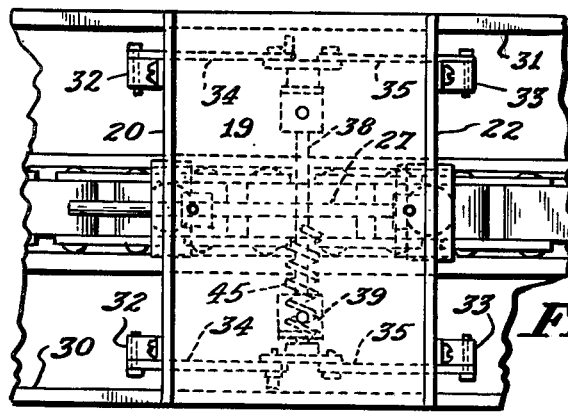

Figure 17 is a plan view of the apparatus shown in section in Figure 15.

Figure 18:
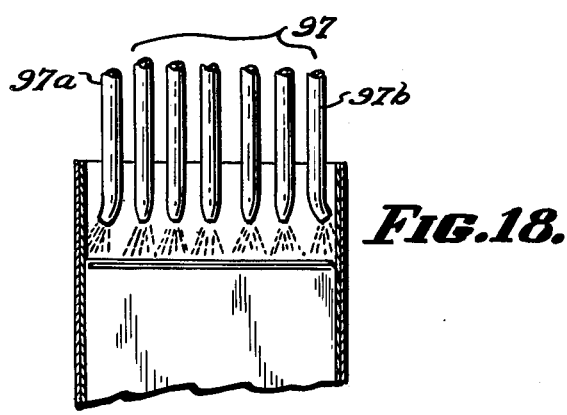

Figure 18 is an elevational view with parts in section showing the relationship of nozzles in one arrangement to a package undergoing treatment.

Figures 19 and 20 are respectively elevational and plan views of a modified sealing apparatus.

Figure 21 is a partial sectional view taken along the section line 21—21 of Figure 19.

Figure 22 is a diagrammatic illustration showing in partial perspective various stages in the treatment of an end closure and seal.

Figure 23 is a partial sectional view taken along the section line 23—23 of Figure 22.

The prior art has not hitherto succeeded in producing a flexible walled package which was thoroughly moisture and gas tight by operations involving the wrapping of a paperboard carton. A gas and moisture tight result can be secured in accordance with the teachings of my copending application, Serial No. 737,269 filed March 26, 1947, and entitled Wrapped Gas-Tight Package, now abandoned, through the use of a wrapper, and by a special mode of folding involving the production of ears but eliminating the re-entrant folds which hitherto had caused minute passageways from the exterior of the wrapper to the interior thereof. As compared with the teachings of that application, my object in the present invention is to produce a more dependable seal with a greater margin of safety as respects moisture-tightness and gas-tightness, a seal which is stronger and more resistant to abuse and the strains of handling and shipment, and a seal not characterized by ears which must be folded and disposed against the package. In the method of the present invention, the wrapping may be accomplished in the conventional way, by conventional means, as will hereinafter be made clear.

In a copending application, Serial No. 661,164, filed April 10, 1946, and entitled Means and Methods for Securing the Effect of End Dipping in Gas-Tight Flexible Wall Packages, now Patent Number 2,548,251, granted April 10, 1951, I have developed the concept of a moisture and gas-tight package comprising a paperboard carton as the foundation, with a sleeve-like wrapper extending about the body walls thereof and provided with a tight longitudinal seam. A seal of thermoplastic substance was deposited upon the ends of the carton in such a way as to bond with the sleeve, as by end dipping, or in other ways. This deposit of sealing substance was molded and distributed, in connection with a cap sheet or cover, with the production of a neat and dependably tight package. As compared with the teachings of that application, my objects here include a simplification of procedural steps, the elimination of the cap sheet and the separate handling thereof and the provision of a process and mechanism of generally simpler character, requiring fewer individual steps.

In the present method I employ a sheet or web which is used as a wrapper for a package such as a paperboard carton and its contents. It is possible to associate the web with the collapsed or knock-down paperboard carton in the form in which it is shipped to the user. However in this specification I shall describe a procedure in which the carton is first filled and closed in the usual manner, and is afterward treated to give a moisture tight and gas tight result.

The invention is not limited to the specific character of the web of material which forms the wrapper, which can be varied to obtain specific desired results. The wrapper, in surrounding any consecutive series of body walls of the carton, will form a sleeve with a longitudinal, moisture and gas tight seam, which is preferably formed by the use of an adhesive of thermoplastic character. The wrapper may be in the form of an uncoated web, and the seam produced by an application of suitable adhesive at the lapping parts. However I prefer to employ for the wrapper a web of material precoated with a thermoplastic adhesive, and I shall describe my invention in this form. The particular qualities of proofness against liquids, moisture, vapor and gas may be attained either in the web itself, or in the adhesive which forms a coating thereon, or in both, but it will be obvious that the adhesive relied upon for seam formation will require qualities of the desired proofness. The web material may be of paper, glassine or similar cellulose, any of the non-fibrous films of commerce depending upon the specific qualities desired, or laminated materials made up of paper, film, metal foil and the like in various combinations. The adhesive employed may likewise be considerably varied, the requirements being that it have the desired qualities of proofness for the use intended, and that it be non-brittle at ordinary or room temperatures or throughout a temperature range likely to be met in use, so that the package will satisfactorily resist the strains of handling, shipment and storage. Mixtures of microcrystalline wax and various resinous substances are excellent for use in my process, not only as a coating for the web material used to form a wrapper, but also for the formation of seams therein, and for the end seals hereinafter described. By way of a single example, but without limitation on the invention herein claimed, I may employ an adhesive made up as follows:

100 parts microcrystalline wax of about 145 to 165° F. melting point.

15 parts of a mixture of microcrystalline wax (75 parts) milled together with 25 parts of a medium molecular weight polybutene, by which I mean one having a molecular weight of 80,000 to 100,000.

3 parts of a low molecular weight polybutene, by which I mean a material having a molecular weight appreciably below the above stated range.

Another suitable formula is as follows:

95 parts medium microcrystalline wax, having a melting point of 145° to 165° F.

25 parts polybutene of medium molecular weight as above.

10 parts of a synthetic hydrocarbon polymer in the form of a viscous liquid acting as a plasticizer.

All parts in these formulae are by weight. My invention is not, however, limited to the use of any particular formulae, nor even to the employment of adhesive and sealing substances which are of thermoplastic character. Adhesives dissolved in various solvents may also be employed, though not so conveniently. The use of a solvent requires time for the elimination thereof by evaporation, and in some circumstances the employment of solvents may tend to taint the contents of the package.

Advantages of the process herein set forth include the fact that dependable seals may be made without dipping, and without any substantial subjecting of the contents of the package to the heat involved in dipping. Since the quantities of heat involved are small with relation to the bulk of the contents of the package, difficulty is not encountered with expansion of air or other gas inside the package tending to blow holes in a seal produced thereon, and the adhesives are more easily applied and controlled as will hereinafter be set forth.

Figure 1:
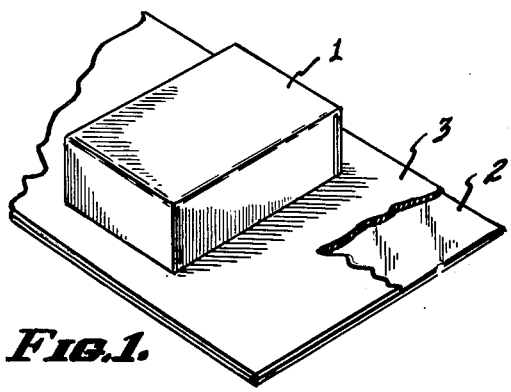
Figure 2:
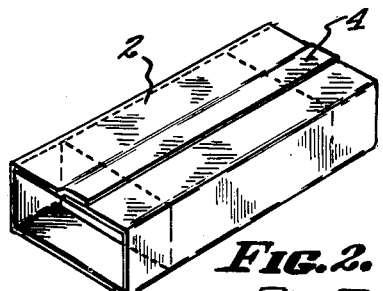

Briefly, in the practice of my invention in its preferred form, I provide a paperboard carton of any suitable form or shape. This may be and preferably will be of paper board printed or decorated in any desired manner for identification and merchandising appeal. Such a carton is erected, closed on one end, filled with the contents and closed on the other in the usual fashion and on the usual equipment for the purpose. The carton is then wrapped in a wrapper sheet or web of the kind set forth above. In Figure 1, I have indicated a filled and closed carton, which is shown as resting upon a wrapper sheet or web 2 of suitable material coated preferably with a layer of thermoplastic adhesive 3. The wrapper sheet or web will next be brought about a series of consecutive body walls of the carton, as shown in Figure 2 and formed into a sleeve by lapping and the provision of a longitudinal seam 4. The carton is now surrounded by a tubular sleeve, open at both ends, where the material of the wrapper sheet extends beyond the ends of the inner paperboard carton.

Figures 3, 4:
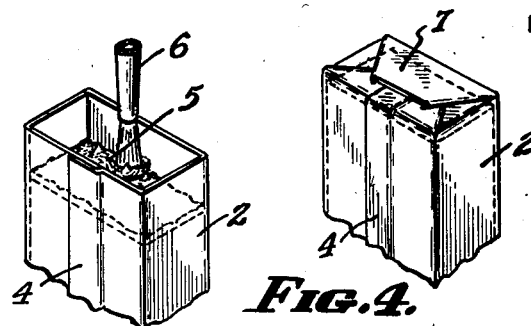

The next step in my process is illustrated diagrammatically in Figure 3 where I have shown a layer or coating of thermoplastic sealing material 5 being deposited on the carton end inside the open, sleeve-like wrapper. The thermoplastic material may be deposited upon the carton end in a heat-softened condition, and while this condition persists, I prefer to fold the wrapper end as indicated at 7 in Figure 4. It will be seen that the folded wrapper end now forms a covering for the layer 5 of thermoplastic material.

When the parts have been manipulated as hereinabove described, it will be understood that at the ends of the carton I now have a layer of thermoplastic sealing substance extending entirely across the tubular wrapper from side to side and forming a seal by bonding to the wrapper or its thermoplastic coating from the inside. When the folded wrapper is pressed against the layer of thermoplastic substance, this substance also seals the overlying folded portions of the wrapper preventing the entrance or escape of gases or vapors at these points. The thermoplastic substance may also serve to keep the folded portions of the wrapper in folded condition, although overlapping portions of the wrapper may be adhesively secured to each other either by the coating 3 of thermoplastic substance on the wrapper sheet, or by added adhesive as may be desired.

Figures 5, 6:
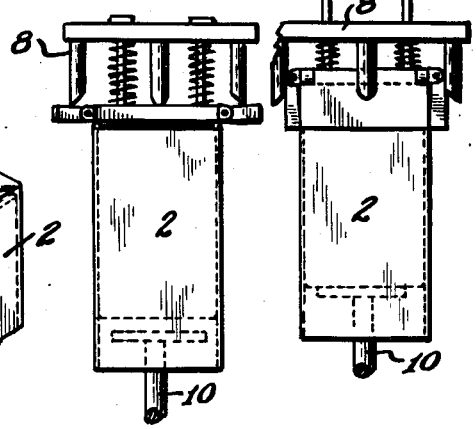

It will be observed that the folded wrapper entirely covers the layer 5 of thermoplastic material deposited upon the carton end. Thus this layer is completely protected from external conditions, without the use of any cover or cap sheet as in my former application referred to above. Also, so long as the thermoplastic material 5 remains in softened condition (or if it is reactivated) it is readily possible to insure the distribution thereof across the carton end and inside the liner so as to bridge the gap between the walls of the liner and effect a perfect and positive seal, by merely manipulating the thermoplastic material through the portions of the wrapper web which cover it. Thus the layer 5 of thermoplastic material is susceptible to molding, much in the way taught in my copending application. In Figures 5 and 6 I have shown a package undergoing molding treatment on one end by means of a molding device indicated generally at 8 and hereinafter described in detail. The package, undergoing this treatment, may be supported from beneath as by a platform member 10. The result of the molding operation may be that illustrated in Figures 7, 8 and 9, where, by reason of the molding means the thermoplastic substance has been positively spread to the edges of the carton end to form enlarged areas or masses 13, while an adequate film of the thermoplastic sealing substance 14 is caused to cover the carton end. It may be noted likewise that the thermoplastic material has been distributed in such a way that some of it is forced downwardly between the sleeve 2 and the walls of the carton 1, as indicated at 16. It will be forced, also, into the interstices of the folded wrapper end.

The treatment indicated for one end of the package will, of course, be repeated upon the other end; and the net result is a package in which the contents are retained in a closed paperboard carton, giving strength to the whole, while the qualities of proofness are attained primarily from an overlying sleeve with a tight longitudinal seam covering one series of connecting body walls of the paperboard carton, the end of the sleeve being sealed by bridging masses of thermoplastic substance which masses are positively distributed across the entire cross-sectional area of the sleeve, the substance of the sleeve being folded over onto the bridging masses of thermoplastic sealing substance and covering them, and all folds in the wrapper being located beyond the seal at each end of the package which is the bridging mass of thermoplastic sealing substance.

The structure which I have just described, and the steps of making it are easily produced and performed by mechanical means. I shall next describe a mechanism for the purpose. Reference is made to Figures 10 and 11 showing parts of a mechanism comprising a general framework 17, and embodying a conveyor chain 18, the upper flight of which may be driven continuously from left to right in these figures by any suitable mechanical drive. Mounted so as to move with the conveyor I provide a plurality of package handling elements, each comprising a main platform 19 of the general size and shape of one wall of the carton, and platform members 20 and 22 of the general size and shape of adjacent walls of the carton hinged to the main platform 19.

Referring to Figure 15 and companion Figures 16 and 17, I have shown the chain 18 moving in a guide way 24 mounted on the general framework 17. A pair of links 18a and 18b of the chain bear standards 25 and 26, and a shaft 27 having its axis in line with the chain is journaled in these standards. The main platform 19 is mounted upon the shaft 27 by means of bracket members 28 and 29. The purpose of this construction is to provide for a swinging of the main platform 19 from the intermediate horizontal position illustrated to vertical positions on either side of the chain 18 for purposes hereinafter set forth. At the station of the machine illustrated in Figures 10 and 11 the main platform 19 is maintained in the horizontal position by side members 30 and 31 on the framework 17.

As indicated above, the supplementary platform members 20 and 22 are hinged to the platform 19 at their edges. At either end these supplementary platform members bear angle brackets 32 and 33 which are connected by links 34 and 35 to opposite peripheral portions of disc members 36 and 37 mounted upon a shaft 38, journaled in brackets 39 and 40 on the main platform 19. These discs also bear pins indicated at 41 and 42 which, engaging cam members 43 and 44 on the elements 30 and 31, provide a means whereby these cam members can rotate the shaft 38. When so actuated by the cams, the shaft 38 is rotated so that, as shown in Figure 10, the linkage members 34 and 35 pull the supplementary platform members 20 and 22 to positions coplanar with the main platform member 19. When the cam members 43 and 44 terminate in the direction of the length of the machine, a spring 45, engaged at one end with the shaft 38 and at the other with the bracket 39 rotates the shaft in such a way as to move the supplementary platforms 20 and 22 to positions at right angles to the main platform 19 as illustrated in Figure 15.

In the operation of the machine, at a position where the supplementary platforms 20 and 22 are coplanar with the main platform 19, the coated wrapper sheet 2 is placed on the platforms and the filled and closed carton 1 is superposed on the wrapper in such a way as to cause one of its walls to coincide with the main platform 19. This may be accomplished by suitable delivery means both for the wrapper sheet and for the filled and closed carton. As the assembly travels in the direction in which the conveyor chain 18 is moving, the cam members 43 and 44 terminate as will be clear in Figure 10, whereupon the supplementary platform elements 20 and 22 move upwardly to positions at right angles to the main platform 19, folding the wrapper sheet 2 about adjacent walls of the carton. A driven tucking element 46, pivoted above the path of travel of the combination, is actuated in time with the travel of the combination to fold forwardly the trailing projecting end of the wrapper sheet over the top wall of the box as shown in Figure 10, after which the front or leading projecting end of the wrapper sheet is folded rearwardly by the upturned ends of a plurality of pressure bars, or a single pressure plate 47. This pressure plate may be provided with electrical heating means 48 which, acting through the plate 47 on the coating 3 borne by the wrapper sheet effects the sealing of the longitudinal seam of the sleeve as will be understood. The various members contacting the wrapper may be heated so as, if desired, to cause the wrapper to adhere to all body walls of the carton, in part or throughout their area. It is to be noted that a transparent wrapper adhered by a translucent adhesive to a printed body wall does not obscure the printing but rather enhances its appearance.

During this sealing operation the then uppermost or top wall of the paperboard carton supports the superposed ends of the wrapper sheet. Theoretically it is not necessary to continue the seam beyond the ends of the top wall of the carton; but practically there is an advantage in doing so in that molten sealing material subsequently introduced into the ends of the sleeve will be retained there and will not tend to collect in or flow through unjoined portions of the wrapper sheet off the ends of the carton. To effect a continuation of the sealing of the longitudinal seam beyond the ends of the carton I make use of a mechanism next to be described.

On each side of the machine I mount a chain 49 on sprockets indicated at 50 and 51, and drive these sprockets in timed relationship with the main conveyor chain. To the chains 49, I pivot the arms 52, the construction of which is most clearly shown in Figure 12. Each such arm is pivoted centrally to a bracket 53 on the chain 49, and each arm has an outer portion to be engaged for operation and an inner portion for engagement with the underside of the longitudinal seam of the wrapper in that portion of the wrapper sheet lying off the ends of the carton 1. The chains cause the arms to move with the cartons, and the arms are actuated to the positions shown in Figure 12 by cam rods 54 mounted on suitable brackets on the machine, there being other cam rods 55 serving to return the arms 52 to the non-operating position. Beneath the upper flights of the chains 49 in the positions where the arms 52 become operative, I may locate supports 54 (Figure 12) on suitable brackets on the side members 30 and 31. The arms coacting with the heating elements 48 and pressure plate 47 effect a sealing of the longitudinal seam off the ends of the carton.

The result of the operations thus far described is the formation about the filled and closed carton 1 of a sleeve of suitable gas and moisture tight material with a tight longitudinal seam. Referring now to Figures 10a and 11a, I change the position of the wrapped carton from the horizontal to the vertical for the production of end seals on the package. This is accomplished by swinging the entire support for the wrapped carton comprising the main platform 19 and supplementary platform members 20 and 22, these platform members remaining in tight engagement with the same three walls of the wrapped carton. The side members 30 and 31 of the machine terminate, and a pair of tilting rods 55 and 56 swing the platform structure to its new position. The platform structure rotates on the shaft 27 as a pivot by means of the arms 28 and 29, as will be clear from Figure 13. The main platform member 19 engages the frame 17 of the machine at its edge. When the package is swung from the horizontal to the vertical position, its free side is engaged by a spring pressed pressure plate 57 located near the upper edges of the body walls of the carton. The wrapper or sleeve of the carton is thus confined all about the upper edges of the package, and the projecting portion of the wrapper forms a trough or tray in which molten sealing material may be deposited. One way of effecting the deposit is through the agency of a plurality of nozzles or spouts 58, rotatably mounted in connection with a supply pipe 59 which leads from a source of molten sealing material (not shown). The supply pipe has a valve 60 operated by suitable means in timed relationship to the movement of the machine. Also the nozzles 58 are arranged to swing about a common connection 61 as a pivot. To this end the connection is provided with a gear or gear segment 62 which engages a rack 63 mounted on a rod 64 slidably journaled on the machine. The rod 64 is actuated in time sequence to the movements of the machine so that as a package moves from left to right in Figure 10a the nozzle assembly 58 will swing into the open end of the wrapper, and will not only move with the package but will traverse across the end thereof in such a way as to provide a uniform deposit covering the entire end of the carton and distributed up into the corners of the projecting wrapper end. This deposit is indicated at 5 in Figures 10a and 11a. The confining of the wrapper or sleeve about the upper edges of the walls of the carton prevents the molten sealing substance from flowing down against these carton walls and between them and the sleeve.

The wrapper end is next rapidly folded. This may be accomplished by a movable tucking folder 64 operated by a rack and pinion arrangement in timed relationship to the movements of the machine, and by a tucking sweep 65 which is stationary. These elements tuck forwardly a trailing portion of the projecting liner end and rearwardly a leading portion thereof as will be clear from the figures. The laterally projecting portions of the liner are folded inwardly by a pair of stationary folding sweeps 66 and 67. These elements are all mounted on the machine frame on suitable brackets. It will be understood that the poured layer of thermoplastic sealing substance is now entirely enclosed within the wrapper at the upper end of the carton.

The sequence of steps just described can be appreciated from Figure 22. If desired, a spot of adhesive 68 may be applied to the underside of the last folded portion of the wrapper sheet, or if the wrapper sheet is coated with thermoplastic adhesive this may be relied upon to cement it down into position when reactivated by the heat of the layer 5. The final folded condition of the projecting wrapper end will appear as at 69 in Figure 22. A cross sectional view of the unmolded end of the package will appear as in Figure 23.

As explained above it is only necessary for the securing of tightness that the deposit 5 of thermoplastic sealing substance extend entirely across the cross sectional area of the sleeve in an unbroken condition, and bond with the sleeve walls at all points. The nozzles 58 effect an initial distribution of the thermoplastic sealing substance which, depending upon its particular viscosity, may be self leveling due to its heated condition. The folding over of the projecting portion of the liner end and the pressure exerted by the folding elements 65, 66 and 67, especially the latter which is shielded from the thermoplastic sealing substance by the completely folded wrapper end, will effect a further distribution; and so far as tightness alone is concerned dependable results may be secured without any further treatment whatever.

However a molded condition of the thermoplastic sealing substance at the end of the package is frequently desired for reasons which have been given above. To attain this condition I subject the end of the package to a molding treatment preferably at a time when the thermoplastic sealing substance is still soft enough to be plastic and adhesive, although it is possible by the use of heated molding members to resoften a deposit of thermoplastic sealing substance sufficiently for the purpose.

The molding device employed is analogous to one disclosed in my copending application referred to above. As best illustrated in Figure 11b, it comprises a main platform 70 to which are hinged side wall elements 71 and 72 and end wall elements 73 and 74. There are resilient means (not shown) to maintain the side and end wall elements normally coplanar with the main platform 70.

As best shown in Figure 10b, the main platform 70 is mounted by means of studs 75 and 76 on a base 77 on a chain 78 directed in its lower flight by sheaves 79 and 80, and arranged to be driven in timed relationship to the movements of the machine so that each main platform 70 will be presented to the upper end surface of a package treated as hereinbefore described. The base 77 also bears posts 81 lying in the paths of movement of the side wall and end wall members 71, 72 and 73, 74 and acting, when the main platform 70 is moved toward the base 77 to swing these side and end wall members into relationships substantially at right angles to the main platform member.

Figure 7:
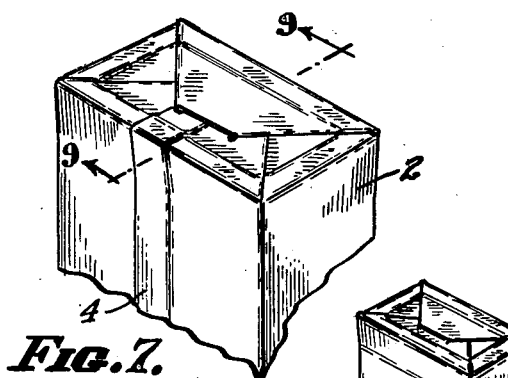
Figures 8, 9:
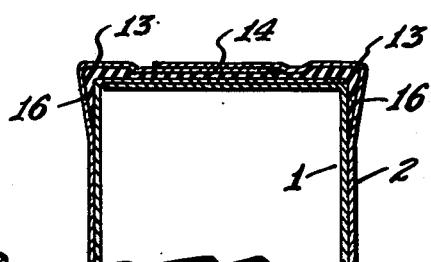
Figure 9 is a partial sectional view through a flexible walled package taken along the section line 9—9 of Figure 7.

On a chain 82 located beneath the packages in their path of travel, and moving over sprockets 83 and 84, driven in timed relationship to the movements of the machine, I mount slide bearings 85 for rods 86 which have heads 87. A cam member 88 fixed to the machine frame on suitable brackets actuates the rods 86. When the chain 78 has positioned one of the molding members above a package, the corresponding rod 86 is moved upwardly by the cam 88, and the head 87 raises the package against the main platform 70 of the molding member, moving this platform upwardly. Concurrently the rods 81 move the side and end wall members of the molding device downwardly. The exertion of pressure on the still plastic filling of thermoplastic material assures a desired distribution thereof, forcing some of the material down around the upper edges of the body walls of the carton, and also forcing the material into interstices in the folded wrapper end. The platform 70 and side and end wall members 71 to 74 may be configured as desired, for example to give the shape to the molded filling of thermoplastic material which is illustrated in Figures 7, 8 and 9. Other configurations may, of course, be employed, including conforming the molding means to the various thicknesses of folds of the folded liner end. Aside from a positive distribution of the thermoplastic sealing substance the molding step provides excess substance at lines of weakness or areas of the severest expected wear in use. It will be understood also that the use either of molding or pressure forces the thermoplastic sealing substance into the folds of the wrapper and further insures the tightness of the package in this way.

During the molding operation just described and illustrated in Figures 10b and 11b the packages may be retained in the cages formed by the main platforms 19 and supplementary platforms 20 and 22 by a holding member 89. When the molding operation has been completed this holding member terminates in the direction of motion of the packages, and platform swinging rods 90 and 91 swing the platform assembly from a vertical position on one side of the machine, through the horizontal to a vertical position on the other side of the machine as will be understood. In a continuation of the length of the machine, mechanism described and illustrated in connection with Figures 10a, 11a, 10b and 11b will come into operation to deposit thermoplastic sealing substance into the open sleeve at the opposite end of the packages, fold the projecting sleeve end, and press or mold the filling of thermoplastic substance.

Figure 14 shows the package on the side of the machine opposite that shown in Figure 13. The headed rod 86a by which the package is raised against the molding device indicated at 70a engages the previously formed seal at what is now the bottom of the package. The operation of the working instrumentalities is the same, and the formation of the second seal completes the manufacture of the fully proofed package. The operating instrumentalities are illustrated in Figures 11c and 11d in plan and do not require special description. Like parts have been given like index numerals followed by the letter "a." Upon the completion of these operations an abutment 92 on the machine frame, engaging one of the pins 36 or 37 on the shaft 27 operates to swing outwardly the supplementary platform elements 20 and 22 so as to release the completely formed package, which may be caught on any suitable conveying or stacking mechanism. The release of the package is shown occurring at 93 in Figure 11d.

In Figures 19 and 20 I have illustrated a modified procedure and apparatus in which the packages are handled throughout in the horizontal position. At 94 in these figures I have illustrated a package wrapped so as to form a sleeve about its body walls by procedure and mechanism such as described in connection with Figures 10 and 11. As the packages proceed to the right in Figures 19 and 20 hold-down devices 95 and 96 are brought against their upper surfaces, the remaining surfaces of the packages being confined between the main platforms 19 and side or supplementary platforms 20 and 22 of the wrapping mechanism. The filling of thermoplastic substance is introduced into the projecting ends of the wrapper by nozzle arrangements indicated generally at 97, 98, 99 and 100. Two sets of nozzles may be employed as shown in order to introduce the fillings of thermoplastic material in successive increments. Again it is desired that the nozzles follow and move with respect to the packages as they advance through the machine, and to this end I provide pivotal mountings for the nozzles and flexible connections for them to sources of supply of molten thermoplastic material (not shown). The nozzles are swung between positions shown in solid and dotted lines in Figure 20 by mechanical means operated in timed sequence to the movements of the machine. In Figure 18 I have illustrated a nozzle arrangement in which outer ones of the group, 97a and 97b, have out-turned ends so as to deposit the filling substance up into the lateral corners where the wrapper or sleeve meets the edges of the carton end.

In the embodiment of the machine shown in Figures 19 and 20 I prefer to hinge to the ends of each main platform 19 U-shaped retaining means 101. These means are operated by a cam or rod member 102 so as to be swung upwardly, the U-shaped elements supporting marginal portions of the sleeve where it extends beyond the ends of the paperboard carton. As soon as the fillings of thermoplastic sealing substance have been deposited across the ends of the carton the projecting ends of the sleeve are folded in a manner similar to that described above. I have illustrated moving sweeps or fingers 103 and 104 for folding trailer liner portions and stationary sweeps 105 and 106 for folding the leading liner portions. Lateral portions of the sleeve are folded inwardly by stationary sweep elements 107, 108, 109 and 110.

The packages may then be subjected either to end pressure or to molding as described above. If molding is practiced, the molding elements move in from lateral positions in which they travel with the packages as will readily be understood. In this event the molding of the fillings of thermoplastic sealing substance at both ends of the package will be carried on simultaneously, the molding devices will be moved toward the package, and the thrust of the molding device upon one side will be sustained by the opposite thrust of the molding device on the other side. When the packages have been completed as set forth, they may be released by moving the supplementary platform means 20 and 22 to release them, whereupon they may be delivered to receiving means at the end of the conveyor 111 by which the package retaining elements are moved through the machine.

My disclosure herein is directed to the provision of a machine and method for the formation of tight packages of flexible walled materials, and to packages so produced. Such packages may be formed especially for gassing operations effecting an atmospheric exchange. The gassing is preferably accomplished by first forming the packages in a gas tight condition as herein taught, then puncturing them, effecting the introduction of the desired atmosphere and the expulsion of the initial atmosphere, and resealing the punctures. For structures of cartons designed to permit gassing, and for gassing procedures, reference is made to my copending applications, Serial No. 553,374, filed September 9, 1944, and entitled Method of Gassing Filled Packages, now Patent Number 2,506,769, granted May 9, 1950, and Serial No. 557,984 filed October 10, 1944, and entitled Method of Making Gas Filled Flexible Containers, now Patent Number 2,442,161, granted May 25, 1948.

Modifications may be made in my invention without departing from the spirit thereof. Having thus described my invention in certain exemplary embodiments, what I claim as new and desire to secure by Letters Patent is:

1. In a machine for sealing the ends of wrapped articles encased in tubular wrappers, means for transporting a wrapped article with the wrapper extending beyond the ends of the article, said transporting means including a main platform and adjacent supplementary platform members hinged to said main platform member, means for moving said supplementary platform members to engage opposite walls of an article positioned on said main platform member, means mounting said platform members for movement as a unit from a horizontal to a vertical position for the introduction of sealing substance into the extending ends of said wrapper, means for introducing masses of sealing substance into the extending ends of said wrapper, said last mentioned means including nozzle means traveling with the wrapped article during the introduction of the sealing substance into the ends of the wrapper, means for folding the projecting ends of the wrapper over the sealing substance so introduced, and means for subjecting the ends of the article and the enclosed masses of sealing substance to pressure to insure positive distribution of the sealing substance across the ends of the article.

2. In a machine for sealing the ends of wrapped articles encased in tubular wrappers, means for transporting a wrapped article with the wrapper extending beyond the ends of the article, said transporting means including a main platform member and adjacent supplementary platform members hinged to said main platform member, means for moving said supplementary platform members to engage opposite walls of an article positioned on said main platform member, means mounting said platform members for movement as a unit from a horizontal to a vertical position for the introduction of sealing substance into the extending ends of the wrapper, means for introducing masses of sealing substance into the ends of the wrapper, said last mentioned means including nozzle means traveling with the wrapped article during the introduction of the sealing substance into the ends of the wrapper, means for folding the projecting ends of the wrapper over the sealing substance so introduced, and means for subjecting the ends of the article and the enclosed masses of sealing substance to pressure to insure positive distribution of the sealing substance across the ends of the article, said last mentioned means comprising molding means and means for producing relative movement of said package and said folding means.

3. In a machine for sealing the ends of wrapped articles encased in tubular wrappers, means for transporting a wrapped article with the wrapper extending beyond the end of the article, said transporting means including a main platform member and adjacent supplementary platform members hinged to said main platform member, means for moving said supplementary platform members to engage opposite walls of an article positioned on said main platform member, means mounting said platform members for moving as a unit from a horizontal to a vertical position for the introduction of sealing substance into the extending ends of the wrapper, means for introducing masses of sealing substance into the extending ends of the wrapper, said last mentioned means including nozzle means traveling with the wrapped article during the introduction of the sealing substance into the extending ends of the wrapper, means for folding the projecting ends of the wrapper over the sealing substance so introduced means for subjecting the ends of the article and the enclosed masses of sealing substance to pressure to insure positive distribution of the sealing substance across the ends of the article, said last mentioned means comprising molding means including a main platform to be brought against end portions of said package and supplementary platform means swingable to positions substantially at right angles to said main platform means opposite end portions of the body walls of said packages.

4. In a machine for sealing the ends of wrapped articles encased in tubular wrappers, means for transporting a wrapped article with the wrapper extending beyond the ends of the article, said transporting means including a main platform and adjacent supplementary platform members hinged to said main platform member, means for moving said supplementary platform member to engage opposite walls of an article positioned on said main platform member, means mounting said platform members for movement as a unit from a horizontal to a vertical position for the introduction of sealing substance into the extending ends of the wrapper, means for introducing masses of sealing substance into the extending ends of the wrapper, said last mentioned means including nozzle means traveling with the wrapped article during the introduction of the sealing substance into the wrapper ends, means for folding the projecting ends of the wrapper over the sealing substance so introduced, means for subjecting the ends of the article and the enclosed masses of sealing substance to pressure to insure positive distribution of the sealing substance across the ends of the article, said last mentioned means comprising molding means including a platform to be brought against end portions of the package and supplementary platform means swingable to positions substantially at right angles to said main platform opposite end portions of the body walls of said package, said molding means being so shaped as to effect a distribution of said sealing substance across the ends of the package and inwardly at end portions of the body walls thereof.

SAMUEL BERGSTEIN.

References Cited in the file of this patent

UNITED STATES PATENTS

| Number | Name | Date |
|---|---|---|
| 1,280,212 | Green | Oct. 1, 1918 |
| 1,720,783 | Eckstein | July 16, 1929 |
| 1,769,135 | Hendry | July 1, 1930 |
| 1,865,535 | Meany | July 5, 1932 |
| 1,913,259 | Bashford | June 6, 1933 |
| 2,007,788 | Anderson | July 9, 1935 |
| 2,048,123 | Howard | July 21, 1936 |
| 2,066,414 | Milmoe | Jan. 5, 1937 |
| 2,075,178 | Copeman | Mar. 30, 1937 |
| 2,112,523 | Daller | Mar. 29, 1938 |
| 2,250,921 | Warren | July 29, 1941 |
| 2,251,671 | Frost | Aug. 5, 1941 |
| 2,277,289 | Bergstein | Mar. 24, 1942 |
| 2,291,645 | Nordquist | Aug. 4, 1942 |
| 2,340,836 | Milmoe | Feb. 1, 1944 |
| 2,341,845 | Marks | Feb. 15, 1944 |
| 2,406,301 | Lively | Aug. 20, 1946 |
| 2,412,862 | Bergstein | Dec. 17, 1946 |
| 2,422,899 | Hogdal | June 24, 1947 |
| 2,439,435 | Richardson | Apr. 13, 1948 |
| 2,443,293 | Bergstein | June 15, 1948 |
| 2,496,043 | Farrell | Jan. 31, 1950 |
| 2,519,102 | Bergstein | Aug. 15, 1950 |